(12) United States Patent
Mino

(10) Patent No.: US 7,660,530 B2
(45) Date of Patent: Feb. 9, 2010

(54) OPTICAL TRANSMISSION APPARATUS, OPTICAL TRANSMISSION SYSTEM, AND OPTICAL TRANSMISSION CONTROL METHOD

(75) Inventor: Katsuyuki Mino, Tokyo (JP)

(73) Assignee: NEC Corporation, Tokyo (JP)

( * ) Notice: Subject to any disclaimer, the term of this patent is extended or adjusted under 35 U.S.C. 154(b) by 544 days.

(21) Appl. No.: 11/470,646

(22) Filed: Sep. 7, 2006

(65) Prior Publication Data

US 2007/0116470 A1    May 24, 2007

(30) Foreign Application Priority Data

Nov. 24, 2005    (JP) .............................. 2005-339402

(51) Int. Cl.
  *H04B 10/04*    (2006.01)
  *H04B 10/08*    (2006.01)
  *H04J 14/02*    (2006.01)

(52) U.S. Cl. .............................. 398/94; 398/33; 398/38; 398/197

(58) Field of Classification Search .................... 398/33, 398/37, 38, 93, 94, 197
See application file for complete search history.

(56) References Cited

U.S. PATENT DOCUMENTS 6,040,933 A *    3/2000 Khaleghi et al. ................ 398/1
6,271,945 B1 *   8/2001 Terahara ...................... 398/26
2002/0154356 A1* 10/2002 Krummrich ................. 359/124
2006/0018658 A1* 1/2006 Mori ........................... 398/79

FOREIGN PATENT DOCUMENTS

JP    2002-290331    10/2002

* cited by examiner

*Primary Examiner*—Dalzid Singh
(74) *Attorney, Agent, or Firm*—Whitham Curtis Christofferson & Cook, PC

(57) ABSTRACT

An optical transmission apparatus includes a transmitting unit for transmitting an optical signal with a specified wavelength, a multiplexing unit for multiplexing the optical signal with the specified wavelength and an optical signal with a wavelength other than the specified wavelength and outputting the multiplexed signal as a wavelength division multiplexed optical signal, an optical amplifier for amplifying the wavelength division multiplexed optical signal outputted from the multiplexing unit, a level detecting unit detecting a variation of an optical power of the wavelength division multiplexed optical signal inputted to the optical amplifier, and a level adjusting unit for adjusting, when a variation of the optical power of the wavelength division multiplexed optical signal is detected by the level detecting unit, a transmitting power of the optical signal with the specified wavelength transmitted from the transmitting unit so that an output power becomes a level before the variation.

3 Claims, 15 Drawing Sheets

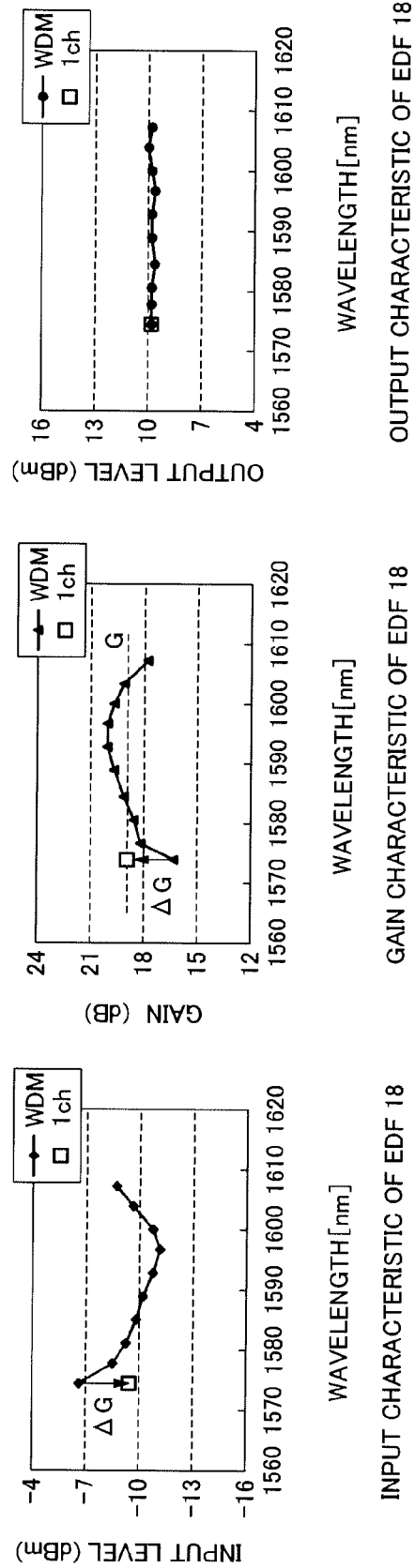

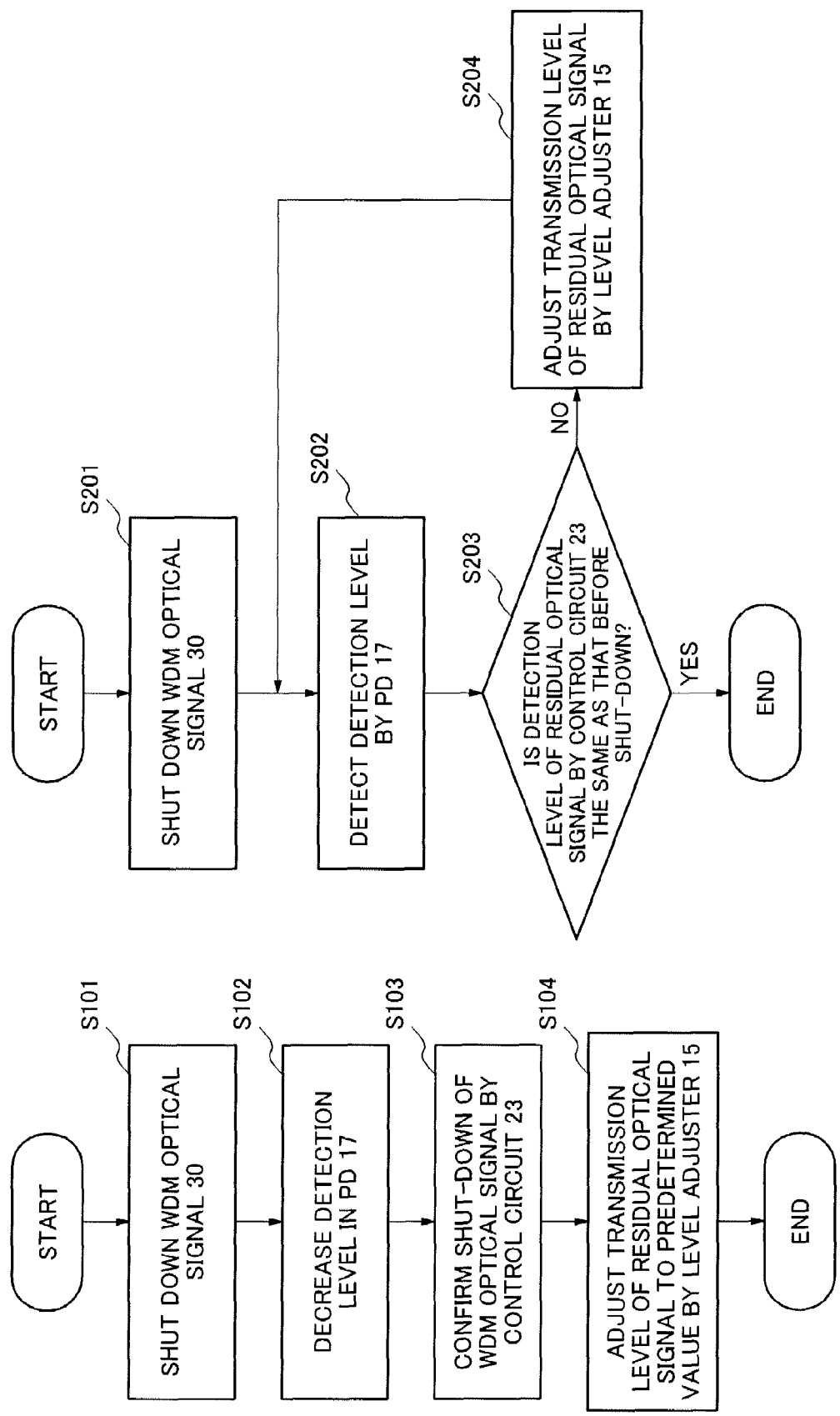

OPTICAL TRANSMISSION APPARATUS, OPTICAL TRANSMISSION SYSTEM, AND OPTICAL TRANSMISSION CONTROL METHOD

BACKGROUND OF THE INVENTON

1. Field of the Invention

The present invention relates to an optical transmission apparatus, an optical transmission system, and an optical transmission control method which are used for transmitting a wavelength division multiplexed optical signal, and more particularly, to an optical transmission apparatus, an optical transmission system including the same, and an optical transmission control method thereof having a function of adding or dropping an optical signal of an arbitrary wavelength.

2. Description of the Related Art

In recent years, along with developments in a photonic network, an optical add/drop multiplexing (OADM) technology is being applied to a wavelength division multiplexing system (WDM system). The OADM technology is particularly essential in a metropolitan area and access method network which connects a user side and a main network. This is because an optical signal of an arbitrary wavelength is added or dropped from a wavelength division multiplexed optical signal, thereby making it possible to rapidly change a communication capacity according to a user and constitute a flexible network.

However, in an optical amplifier used in the OADM technology, an arbitrary wavelength is added or dropped, so an input power level (hereinafter, power level is referred to as "level") to the optical amplifier rapidly changes. For that reason, when the optical amplifier has no control function of following the input level, there arises a problem in that the output level of the optical amplifier transitionally changes.

A description will be given below of a transitional response characteristic in which the output level of an optical amplifier transitionally changes. As indexes indicative of the transitional response characteristic of the optical amplifier, there are a gain excursion, a settling time, and a gain error. FIG. 14 is an explanatory diagram of those indexes which are indicative of the transitional response characteristic of the optical amplifier. The amount of the gain excursion indicates the maximum value of the amount of the gain excursion (or the amount of an output level variation) of the optical amplifier at the time of an input level variation. The settling time is a time to stabilize the gain (or the output level). The gain error indicates the amount of displacement between the gain (or the output level) before the input level variation and the gain (or the output level) after the settling. As described above, a variation in the input level to the optical amplifier leads to occurrence of a phenomenon in which the output level from the optical amplifier transitionally changes.

In association with the above technology, Related Art Document 1 (Japanese Patent Laid-Open No. 2002-290331 A) discloses an example of the optical transmission apparatus to which the OADM technology is applied. In one embodiment of Related Art Document 1, an optical power detecting unit detects the optical power of an optical signal to be outputted from an optical multiplexer and inputted to the optical amplifier. The transmission wavelength property of the optical multiplexer is controlled on the basis of the detected result so that the optical power at each wavelength of the optical signal that is outputted from the multiplexer becomes maximum. Also, in another embodiment, the transmission wavelength of an optical transmitter which becomes an add optical signal is controlled on the basis of the detected result so that the optical power of the optical signal that is transmitted through the optical multiplexer becomes maximum.

In the technology disclosed in Related Art Document 1, because the optical transmission apparatus is controlled so that the optical power of the optical signal that is transmitted through the optical multiplexer becomes maximum, even if there occurs a difference between the wavelength of the optical signal and the transmission wavelength property of an optical multiplexer, control is performed so that the difference is eliminated. As a result, the above technology makes it possible to suppress an increase in coherent crosstalk and a distortion of the signal wavelength which are caused by the wavelength difference, or an increase in beat noise between amplified spontaneous emission (ASE).

However, there arises a problem in that the above control of the transmission wavelength property is incapable of coping with a rapid change in the number of wavelength due to an increase or decrease in the number of signals accompanied by the Add/Drop, or breaking of a line or the like. Hereinafter, an example will be described. When the breaking of a line occurs, there is the possibility that there is a fluctuation of 1 dB or more per 100 msec (millisecond). Also, the amount of level variation becomes 10 dB or more. However, for the control of the transmission wavelength property, in general, a control time takes about several hundred msec, and a control range is equal to or lower than several dB. For that reason, in the control of the transmission wavelength property, when there occurs a rapid fluctuation of the input level due to the breaking of a line or the like, there arises a problem in that the output level of the optical amplifier cannot be suppressed from being transitionally changed.

SUMMARY OF THE INVENTION

In view of the foregoing and other exemplary problems, drawbacks, and disadvantages of the related art methods and structures, exemplary feature of the present invention is to provide an optical transmission apparatus, an optical transmission system, and an optical transmission control method, which are used for transmitting a wavelength division multiplexed optical signal.

An optical transmission apparatus according to the present invention for transmitting a wavelength division multiplexed optical signal, includes (1) a transmitting unit for transmitting an optical signal with a specified wavelength, (2) a multiplexing unit for multiplexing the optical signal with the specified wavelength and an optical signal with a wavelength other than the specified wavelength and outputting the multiplexed signal as a wavelength division multiplexed optical signal, (3) an optical amplifier for amplifying the wavelength division multiplexed optical signal outputted from the multiplexing unit, (4) a level detecting unit detecting a variation of an optical power of the wavelength division multiplexed optical signal inputted to the optical amplifier, and (5) a level adjusting unit for adjusting, when a variation of the optical power of the wavelength division multiplexed optical signal is detected by the level detecting unit, a transmitting power of the optical signal with the specified wavelength transmitted from the transmitting unit so that an output power becomes a level before the variation.

An optical transmission apparatus according to the present invention for transmitting a wavelength division multiplexed optical signal, includes (1) a transmitting unit for transmitting an optical signal with a specified wavelength, (2) a multiplexing unit for multiplexing the optical signal with the specified wavelength and an optical signal with a wavelength other than the specified wavelength and outputting the multiplexed signal as a wavelength division multiplexed optical signal, (3) an optical amplifier for amplifying the wavelength division multiplexed optical signal outputted from the multiplexing unit, (4) a level detecting unit detecting a variation of an optical power of the wavelength division multiplexed optical signal inputted to the optical amplifier, and (5) a pumping light outputting unit for adjusting, when a variation of the optical power of the wavelength division multiplexed optical signal is detected by the level detecting unit, a transmitting power of pumping light inputted to the optical amplifier so that an output power becomes a level before the variation.

An optical transmission system according to the present invention having a plurality of optical transmission apparatuses, for transmitting a wavelength division multiplexed signal, includes (1) a plurality of the optical transmission apparatuses mentioned above, and (2) an optical transmission line for mutually connecting the optical transmission apparatuses.

An optical transmission control method according to the present invention of transmitting a wavelength division multiplexed signal, includes (1) transmitting an optical signal with a specified wavelength, (2) multiplexing the optical signal with the specified wavelength and an optical signal with a wavelength other than the specified wavelength and outputting the multiplexed optical signal as the wavelength division multiplexed optical signal, (3) amplifying the wavelength division multiplexed optical signal, (4) detecting a variation of the optical power of the wavelength division multiplexed optical signal, and (5) adjusting, when the variation of the optical power of the wavelength division multiplexed optical signal is detected, a transmitting power of the optical signal with the specified wavelength so that an output power becomes the level before the variation.

An optical transmission control method according to the present invention of transmitting a wavelength division multiplexed signal, includes (1) transmitting an optical signal with a specified wavelength, (2) multiplexing the optical signal with the specified wavelength and an optical signal with a wavelength other than the specified wavelength and outputting the multiplexed optical signal as the wavelength division multiplexed optical signal, (3) amplifying the wavelength division multiplexed optical signal, (4) detecting a variation of the optical power of the wavelength division multiplexed optical signal, and (5) adjusting, when the variation of the optical power of the wavelength division multiplexed optical signal is detected, a transmitting power pumping light used for amplifying the wavelength division multiplexed optical signal so that the output power becomes the level before the variation.

According to the optical transmission apparatus, the optical transmission system, and the optical transmission control method of the present invention, there produces an effect that the output level of the optical amplifier can be suppressed from transitionally changing with the above simple configuration and method even in a case where the optical power of the wavelength division multiplexed optical signal that is inputted to the optical amplifier is relatively rapidly changed.

BRIEF DESCRIPTION OF THE DRAWINGS

The exemplary aspects, features, and advantages of the present invention will become more apparent from the following detailed description when taken in conjunction with the accompanying drawings wherein:

FIG. 4A is a graph showing an input characteristic of an EDF before and after a failure occurs in the optical transmission apparatus shown in FIG. 1;

FIG. 4B is a graph showing a gain characteristic of the EDF before and after the failure occurs in the optical transmission apparatus shown in FIG. 1;

FIG. 4C is a graph showing an output characteristic of the EDF before and after the failure occurs in the optical transmission apparatus shown in FIG. 1;

FIG. 5A is a flowchart showing a first example of the operation of the optical transmission apparatus shown in FIG. 1;

FIG. 5B is a flowchart showing a second example of the operation of the optical transmission apparatus shown in FIG. 1;

DETAILED DESCRIPTION OF THE EXEMPLARY ASPECTS

Figure 1:
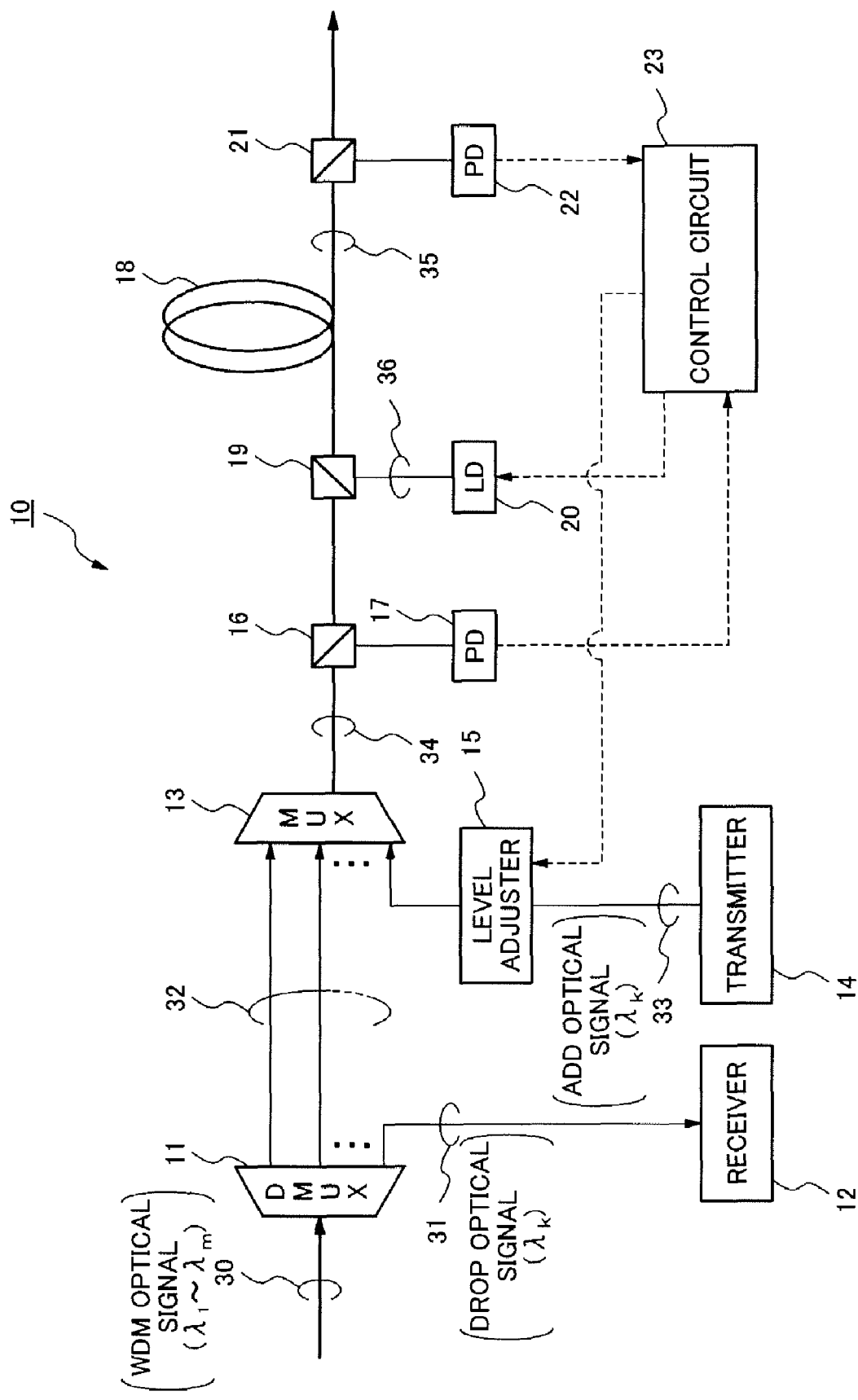
FIG. 1 is a structural diagram showing an optical transmission apparatus according to a first embodiment of the present invention.

Exemplary aspects for carrying out the present invention will be described in detail below with reference to the drawings. The exemplary aspects described below show only illustrative examples in understanding the present invention, and the claims of the invention are not limited to these exemplary aspects.

Hereinafter, a description will be given in more detail of an optical transmission apparatus and a control method thereof according to a first embodiment of the present invention. FIG.

1 is a structural diagram showing an optical transmission apparatus according to a first embodiment of the present invention. The first embodiment will be described with referenced to FIG. 1. In the figure, solid lines are indicative of optical connections, and dotted lines are indicative of electric connections. The "level" is indicative of "power level".

An optical transmission apparatus 10 according to the first embodiment is one type of OADM nodes, and includes a demultiplexer (DMUX) 11 as a demultiplexing unit, a receiver 12 as a receiving unit, a multiplexer (MUX) 13 as a multiplexing unit, and a transmitter 14 as a transmitting unit. Also, the optical transmission apparatus 10 includes an optical coupler 16 and a photodiode (PD) 17 as an input level detecting unit, an erbium doped fiber (EDF) 18, an optical coupler 19, and a pumping laser diode (LD) 20 as an optical amplifier (EDFA), and an optical coupler 21 and a PD 22 as an output level detecting unit. The optical transmission apparatus 10 further includes a level adjuster 15 which is disposed between the transmitter 14 and the multiplexer 13 and a control circuit 23 as a level adjusting unit. The control circuit 23 is electrically connected to the PDs 17 and 22, the pumping LD 20, and the level adjuster 15.

The demultiplexer 11 is connected to the multiplexer 13 and the receiver 12. The multiplexer 13 is connected to the transmitter 14 through the level adjuster 15. Also, the multiplexer 13 is also connected to the optical coupler 16. The optical coupler 16 is connected to the PD 17 and the optical coupler 19. The optical coupler 19 is connected to the EDF 18 and the pumping LD 20. The EDF 18 is connected to the optical coupler 21, and the optical coupler 21 is connected to the PD 22. The control circuit 23 is connected to the level adjuster 15, the PDs 17 and 22, and the pumping LD 20.

The demultiplexer 11 is inputted a wavelength division multiplexed optical signal (hereinafter referred to as "WDM optical signal") 30 into, and demultiplexes the WDM optical signal ($\lambda 1$ to $\lambda m$) 30 into the optical signals of the respective wavelengths. Then, in the demultiplexer 11, the optical signal 31 having a specific wavelength $\lambda k$ (k is an arbitrary integer), (hereinafter referred to as "drop optical signal") branches off from the demultiplexed optical signals, and the remaining optical signals 32 (herein after referred to as "through optical signals") are outputted to the multiplexer 13. The receiver 12 receives the drop optical signal 31 from the multiplexer 11. The transmitter 14 transmits the optical signal 33 having the specific wavelength $\lambda k$ (hereinafter referred to as "add optical signal").

The level adjuster 15 adjusts the optical level of the add optical signal 33 that is transmitted from the transmitter 14. The level adjuster 15 may be made up of, for example, a variable optical attenuator (VOA). In this case, the level adjuster 15 is capable of adjusting the transmission level of the add optical signal 33 by changing a given voltage (or current). The multiplexer 13 multiplexes the add optical signal 33 that has been outputted from the level adjuster 15 and the through optical signals 32 that has been outputted from the demultiplexer 11, and outputs the multiplexed signal as a WDM optical signal 34.

The EDF 18 amplifies the WDM optical signal 34 that has been outputted from the multiplexer 13, by using the pumping light 36 which is inputted thereto through the optical coupler 19 from the pumping LD 20. The gain may be controlled by the intensity of the pumping light 36 outputted from the pumping LD 20. The PD 17 detects the optical level of the WDM optical signal 34 that is outputted from the multiplexer 13 to be inputted to the EDF 18, by branching with the optical coupler 16. The PD 22 detects the optical level of the WDM optical signal 35 that has been amplified to be outputted by the EDF 18, by branching with the optical coupler 21. As described above, the PD 17 detects the optical power of the WDM optical signal 34 that has not yet been amplified by the optical amplifier (EDF 18). On the other hand, the PD 22 detects the optical power of the WDM optical signal 35 that has been already amplified by the optical amplifier (EDF 18).

The control circuit 23 controls the output level of the pumping light 36 outputted from the pumping LD 20 on the basis of the optical levels of the WDM optical signals 34 and 35 which have been detected by the PDs 17 and 22, so that the gain of the EDF 18 is kept constant. Also, the control circuit 23 detects the fluctuation of the through optical signals 32 on the basis of any of the levels or both of the levels of the WDM optical signals 34 and 35 which have been detected by the PDs 17 and 22. In addition, the control circuit 23 controls, when detecting fluctuation of the through optical signals 32, the level adjuster 15 so that the optical level of the add optical signal 33 which has been amplified by the EDF 18 remains the same as before the fluctuation. The control circuit 23 may control the level adjuster 15 so that the output level of the add optical signal 33 that has been amplified by the EDF 18 is kept constant. The control circuit 23 may be made up of, for example, a microcomputer. In this case, those controls can be realized by computer program.

Next, the operation of the optical transmission apparatus 10 will be described. The gain characteristic of the EDF 18 has a wavelength dependence. Therefore, the input level of the WDM optical signal 34 that is inputted to the EDF 18 is predetermined according to the respective wavelengths so as to correspond to the gain characteristic of the EDF 18. As a result, it is possible to prevent the output level of the EDF 18 from having wavelength dependence. For example, the optical signal of the wavelength that is high in the gain is set to be low in input level whereas the optical signal of the wavelength that is low in the gain is set to be high in input level. In this state, the gain of the EDF 18 is controlled so that a difference between the input level (dB value) of the WDM optical signal 34 which is detected by the PD 17 and the output level (dB value) of the WDM optical signal 35 which is detected by the PD 22 is kept constant (that is, the automatic gain control: AGC control). More specifically, in the control circuit 23, the gain of the EDF 18 is controlled by increasing or decreasing the output level of the pumping light 36 outputted from the pumping LD 20.

In this situation, it is assumed that the through optical signals 32 inputted to the multiplexer 13 are shut down due to a circuit disturbance and the like. Then, only the add optical signal 33 is amplified by the EDF 18 through the multiplexer 13.

In this example, it is assumed that the wavelength $\lambda k$ that is used in the add optical signal 33 is a wavelength that is low in the gain in the EDF 18. In this case, the add optical signal 33 is set to become high in the input level so as to offset the lower gain. When a failure occurs, the high input level of the add optical signal 33 is amplified with a constant gain, because the EDF 18 is controlled with a constant gain. As a result, the output level of the add optical signal 33 is raised as compared with that before the failure occurs. On the contrary, it is assumed that the wavelength $\lambda k$ that is used in the add optical signal 33 is a wavelength that is high in gain in the EDF 18. In this case, the add optical signal 33 is set to become low in the input level so as to offset the higher gain. When a failure occurs, the low input level of the add optical signal 33 is amplified with a constant gain, because the EDF 18 is controlled with a constant gain. As a result, the output level of the add optical signal 33 becomes to be lower than that before the failure. For that reason, in the first embodiment, when the fluctuation of the through optical signals 32 are detected, the level adjuster 15 is controlled so that the output level of the add optical signal 33 which is amplified by the EDF 18 is kept constant. As a result, the transitional response of the EDF 18 is suppressed.

Next, the operation of the optical transmission apparatus 10 will be described in more detail.

First, the operation when a total input level is not changed will be described with reference to FIG. 1. The WDM optical signal (λ1 to λm in the wavelength) 30 is demultiplexed into the respective wavelengths by the demultiplexer 11. Then, only the drop optical signal 31 having the wavelength λk is branched and inputted to the receiver 12. The through optical signals 32 having wavelengths other than the wavelength λk are transmitted to the multiplexer 13. On the other hand, the add optical signal 33 having the wavelength λk which has been outputted from the transmitter 14 is adjusted in the optical level by the level adjuster 15. Then, the add optical signal 33 having the wavelength λk is multiplexed by the multiplexer 13 together with the through optical signals 32 having other wavelengths.

The WDM optical signal 34 that has been multiplexed by the multiplexer 13 is outputted to the PD 17 and the optical coupler 19 by means of the optical coupler 16. In the PD 17, the optical level of the WDM optical signal 34 (i.e., the input level to the EDF 18) is monitored, and its result is notified to the control circuit 23. The WDM optical signal 34 that passed through the optical coupler 16 is multiplexed with the pumping light 36 from the pumping LD 20 by means of the optical coupler 19, and then outputted to the EDF 18. Then, in the EDF 18, $Er^{3+}$ is pumped by the pumping light 36, to thereby amplify the optical level of the WDM optical signal 34. Then, the signal is outputted from the EDF 18 as the WDM optical signal 35. Subsequently, a part of the WDM optical signal 35 is outputted to the PD 22 through the optical coupler 21. In the PD 22, the optical level of the WDM optical signal 35 (i.e., output level from the EDF 18) is monitored, and its result is notified to the control circuit 23. In the control circuit 23, an input level (dB value) and an output level (dB value) which have been notified from the PD 17 and the PD 22 are monitored, and the output level of the pumping light 36 outputted from the pumping LD 20 is adjusted so that the difference (a difference between the output level and the input level) is kept constant. The control is generally called "automatic gain control (AGC control)".

Figure 2:
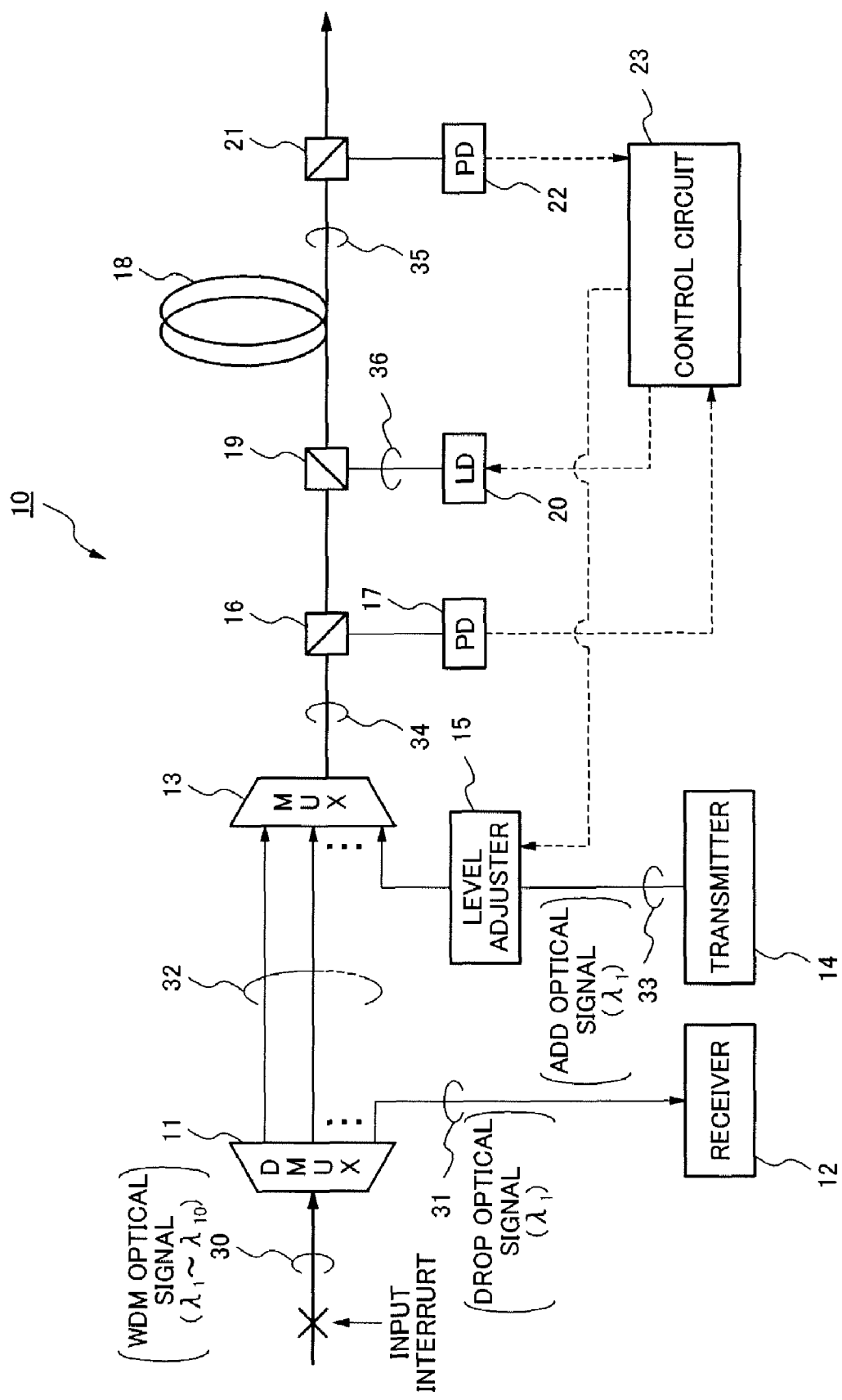
FIG. 2 is an explanatory diagram showing an operation of the optical transmission apparatus shown in FIG. 1.

Next, a description will be given of the operation when the total input level to the EDF 18 fluctuates, with reference to FIG. 2. As an example, it is assumed that the number of wavelength of the WDM optical signal 30 is "10", and the wavelengths of the drop optical signal 31 and the add optical signal 33 are the shortest wavelength λ1. Under the circumstances, it is assumed that a failure occurs in the network on the input side of the demultiplexer 11, and the total input level to the EDF 18 changes. The operation before a failure on the network is described above. More specifically, the input level is monitored by the PD 17, and the output level is monitored by the PD 22. As a result, the output level of the pumping light 36 from the pumping LD 20 is controlled by the control circuit 23 so that the gain have a constant value (G).

Now, it is assumed that the operation after a failure on the network is identical with that before the failure.

Figures 3A, 3B, 3C:
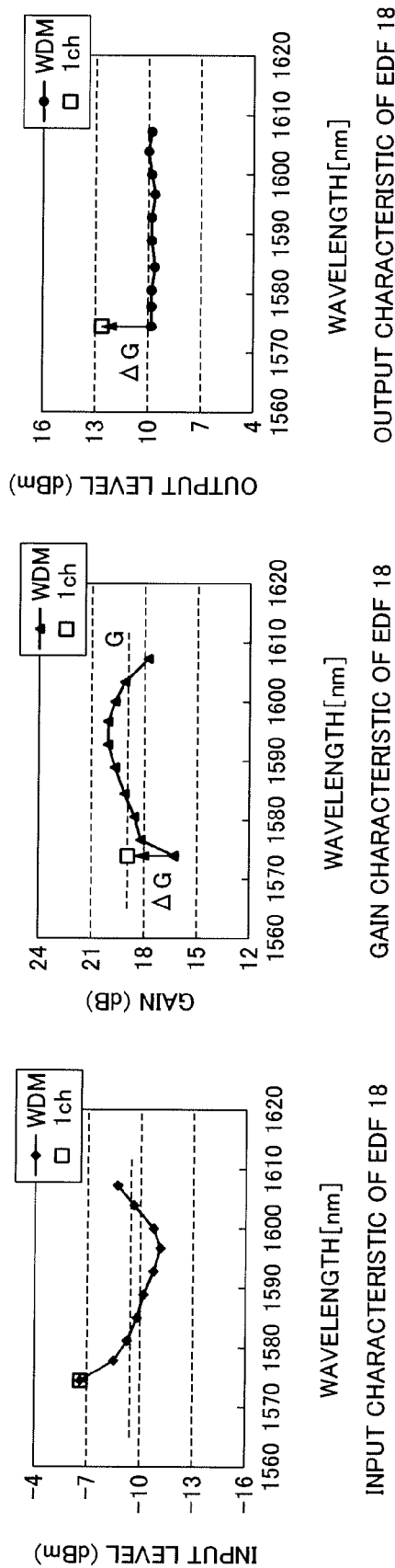
FIG. 3A is a graph showing an input characteristic of an EDF before and after a failure occurs in an optical transmission apparatus which is related to the present invention.
FIG. 3B is a graph showing a gain characteristic of the EDF before and after the failure occurs in the optical transmission apparatus which is related to the present invention.
FIG. 3C is a graph showing an output characteristic of the EDF before and after the failure occurs in the optical transmission apparatus which is related to the present invention.

FIGS. 3A, 3B, and 3C show, with respect to the present invention, an input characteristic, a gain characteristic, and an output characteristic of an EDF in an optical transmission apparatus, respectively, in the case where the same operation is conducted before and after a failure. The indication of the WDM (the number of wavelengths is 10) is before the failure occurs, and the indication of 1ch (the number of wavelengths is 1) is after the failure occurs. As shown in FIG. 3A, even in the case where the number of wavelengths changes from 10 to 1, the input level of the add optical signal 33 (hereinafter referred to as "residual optical signal (1ch)") remains the same. As shown in FIG. 3B, when the number of wavelengths is 1, the gain of the residual optical signal (1ch) increases by ΔG as compared with a case where the number of wavelengths is 10. As shown in FIG. 3C, since the gain of the residual optical signal (1ch) increases by ΔG, the output level of the residual optical signal (1ch) increases by ΔG when the number of wavelengths is 1. As described above, in FIG. 3C, the reason that the output level of the residual optical signal (1ch) changes after the failure occurs is because the gain of the residual optical signal (1ch) changes before and after the failure occurs. The "residual optical signal" is directed to the optical signal that is inputted to the optical amplifier (EDF) even after the failure has occurred.

This is attributable to the fact that the gain of the EDF 18 has the wavelength dependence shown in FIG. 3B. In other words, control is made on the basis of the total input level to the PD 17 and the total output level to the PD 22 so that the gain is kept constant. For that reason, even if the total gain is G, the gain varies according to the wavelength. In other words, because the gain of the EDF 18 has the wavelength dependence, the gain (G−ΔG) of the add optical signal (indicated by the shortest wavelength of "WDM") in the case where the number of wavelengths is "10" is different from the gain (G) of the add optical signal (indicated by "1ch") in the case where the number of wavelengths is "1". As a result, the output level of the add optical signal 33 (i.e., residual optical signal) which is outputted from the EDF 18 changes when the number of wavelengths that is inputted to the EDF 18 varies.

On the contrary, in the first embodiment, when the total input level varies as described above, the total input level variation is detected by the PD 17, and the level controller 15 is controlled by the control circuit 23. FIGS. 4A, 4B, and 4C show an input characteristic, a gain characteristic, and an output characteristic, respectively, of an EDF in the optical transmission apparatus according to the first embodiment before and after a failure occurs. The indication of the WDM (the number of wavelengths is 10) is before the failure, and the indication of 1ch (the number of wavelengths is 1) is after the failure. As shown in FIG. 4A, when the input variation occurs (i.e., the number of wavelengths changes from 10 to 1), the input level of the add optical signal 33 (hereinafter referred to as "residual optical signal (1ch)") is reduced by ΔG by means of the level adjuster 15. As shown in FIG. 4B, when the number of wavelengths is 1, the gain of the residual optical signal (1ch) increases by ΔG as compared with a case where the number of wavelengths is 10. However, as shown in FIG. 4C the output level of the residual optical signal (1ch) remains the same as in the case where when the number of wavelengths is 10, since the input level is reduced by ΔG as shown in FIG. 4A. As described above, in the first embodiment, as shown in FIG. 4A, the input level of the residual optical signal is decreased by the amount (ΔG) of the wavelength dependence, and thereby it is possible to make the output levels of the residual optical signals equal between a case where the number of wavelengths is "10" and a case where the number of wavelengths is "1". As a result, even when the total input level to the EDF 18 varies, the output level of the residual optical signal from the EDF 18 may be controlled to be constant. For that reason, it is possible to improve the transitional response characteristic when the total input level varies.

Figure 5C:
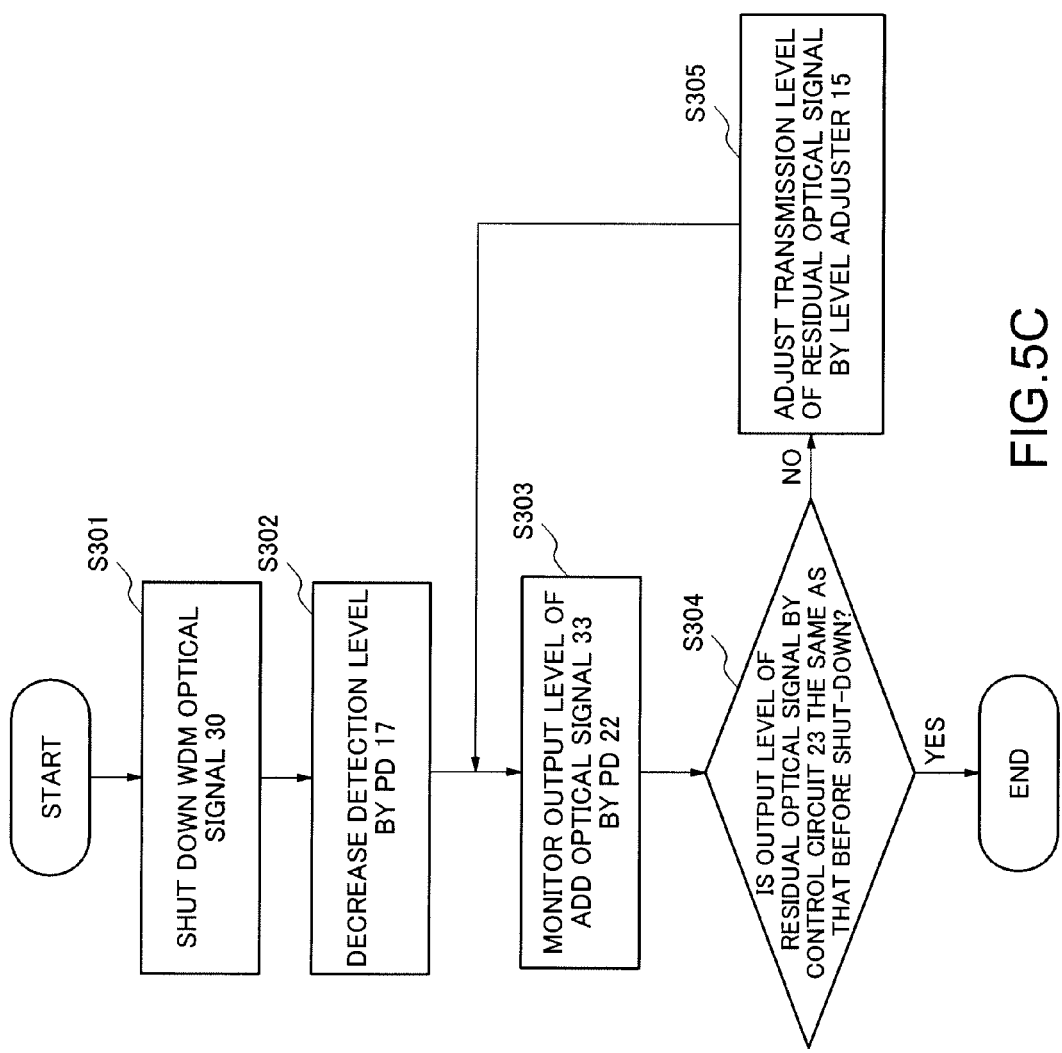
FIG. 5C is a flowchart showing a third example of the operation of the optical transmission apparatus shown in FIG. 1.

FIGS. 5A, 5B, and 5C show control flowcharts for explaining the above operation. In the control flow chart shown in FIG. 5A, the level adjustment of the residual optical signal (add optical signal 33) is conducted by a value that has been predetermined in readiness for a case in which the level should vary. In other words, the above operation is an open control. In the control flow charts shown in FIGS. 5B and 5C, the output level of the residual optical signal (add optical signal 33) is monitored to conduct the level adjustment. In other words, the above operation is a feedback control. The control flow charts mainly includes the above two types.

Hereinafter, the control flow charts will be described in more detail. First, in FIG. 5A, it is assumed first that the WDM optical signal 30 is shut down (Step 101). Then, the detection level in the PD 17 decreases (Step 102). As a result, the control circuit 23 can be notified of the shut-down of the WDM optical signal 30 (Step 103). Subsequently, the control circuit 23 controls the level adjuster 15 in order to change the transmission level of the add optical signal 33 to a predetermined value (Step 104).

Next, in FIG. 5B, it is assumed that the WDM optical signal 30 is shut down (Step 201). Then, the detection level in the PD 17 is detected (Step 202). As a result, the control circuit 23 determines whether the detection level of the residual optical signal (add optical signal 33) is the same as that before the WDM optical signal 30 is shut down, or not (Step 203). If the detection level is not the same, the level adjuster 15 adjusts the transmission level of the residual optical signal (add optical signal 33) (Step 204).

Subsequently, in FIG. 5C, it is assumed that the WDM optical signal 30 is shut down (Step 301). Then, the detection level in the PD 17 decreases (Step 302). Then, the output level of the residual optical signal (add optical signal 33) which is outputted from the EDF 18 by means of the PD 22 is sequentially monitored (Step 303). As a result, the control circuit 23 determines whether the output level of the residual optical signal (add optical signal 33) is the same as that before the WDM optical signal 30 is shut down, or not (Step 304). If the output level is not the same, the transmission level of the residual optical signal (add optical signal 33) is adjusted by the level adjuster 15 (Step S305).

Hereinafter, a description will be given the advantages of the optical transmission apparatus according to the first embodiment.

According to the first embodiment, due to the above-mentioned simple configuration and method, there is the advantage that the transitional response characteristic of the optical amplifier can be improved even in the case where the optical power of the WDM optical signal that is inputted to the optical amplifier (EDF) relatively rapidly varies. The improvement in the transitional response characteristic is attained by controlling the output level of the residual optical signal to a constant value through the adjustment of the transmission level of the residual optical signal (add optical signal).

In the first embodiment, the control speed may be 1 dB or higher per 100 msec. Also, the control range may be 10 dB or higher. As a result, the first embodiment has the effect of being capable of sufficiently coping with the rapid variation of the optical level due to the breaking of a line or circuit disturbances. Also, the control precision may be 1 dB or lower.

Also, there is another advantage that the effect of suppressing the transitional response of the optical amplifier according to the first embodiment does not depend on the bit rate of the residual optical signal or the modulation scheme.

Figure 6:
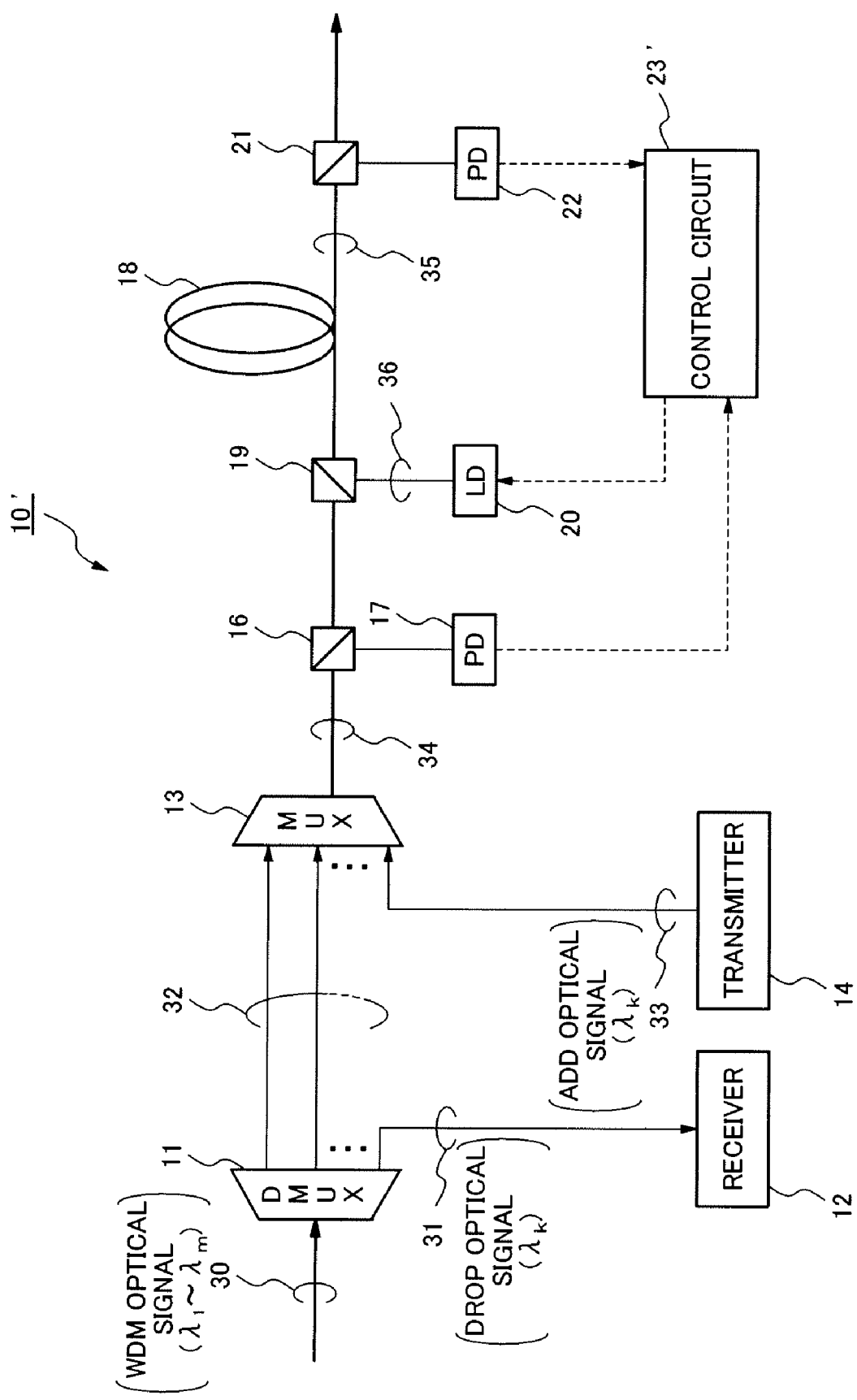
FIG. 6 is a structural diagram showing an optical transmission apparatus according to a second embodiment of the present invention.

Subsequently, a description will be given of an optical transmission apparatus according to a second embodiment of the present invention. FIG. 6 is a structural diagram showing an optical transmission apparatus according to the second embodiment of the present invention. The structural components that are identical with those in FIG. 1 are designated by the same reference symbols, and their description will be omitted. The second embodiment is basically different from the first embodiment in that the second embodiment does not require the level adjuster 15 shown in FIG. 1. Accordingly, the function of the control circuit is different from that of the first embodiment.

A case is assumed in which a variation of the input level to the EDF 18 is detected by the PD 17 (that is, the optical level of the through optical signals 32 vary) in an optical transmission apparatus 10' of the second embodiment. In this case, the second embodiment is different from the first embodiment in that the control circuit 23' does not control the transmission level of the add optical signal 33 (i.e., residual optical signal), but controls the gain of the add optical signal 33. More specifically, the control circuit 23' control the gain so that the output level of the add optical signal 33 that has been amplified by the EDF 18 remains the same as that before the optical level varies. In other words, the second embodiment, when the input level to the EDF 18 varies, changes the gain of the EDF 18 without using the level adjuster 15. More specifically, the output power of the pumping light 36 from the pumping LD 20 is adjusted to control the output level of the add optical signal 33 which is outputted from the EDF 18 to a constant value. As a result, even if the input level of the EDF 18 varies, it is possible to improve the transitional response characteristic of the EDF 18.

As described above, in the first embodiment, the input level of the residual optical signal is attenuated by ΔG by means of the level adjuster 15 as shown in FIG. 4A. As a result, the output level of the residual optical signal remains the same before and after the total input level of the EDF 18 varies. Alternatively, in the second embodiment, the control circuit 23' of FIG. 6 monitors the input level in the PD 17 and the output level in the PD 22, and controls the output level of the pumping light 36 from the pumping LD 20 so that the gain (obtained by subtracting an input level from an output level) corresponding to "G−ΔG" can be obtained. As a result, the same as in the first embodiment characteristic is obtained. In this case, since the control circuit 23' controls the gain of the residual optical signal before and after the total input level of the EDF 18 varies, it is unnecessary to adjust the input level of the residual optical signal.

As described above, according to the second embodiment, due to the above-mentioned simple configuration and method, there is the advantage that the transitional response characteristic of the optical amplifier can be improved even in the case where the optical power of the WDM optical signal that is inputted to the optical amplifier (EDF) relatively rapidly varies. The improvement in the transitional response characteristic is attained by controlling the output level of the residual optical signal to a constant value through the adjustment of the gain of the residual optical signal (i.e., add optical signal). In addition, the second embodiment has the advantage that no level adjuster is required. The second embodiment has the control performance equal to that in the first embodiment. Also, the second embodiment has the effect that the control performance does not depend on the bit rate of the residual optical signal or the modulation scheme.

Subsequently, a description will be given of an optical transmission apparatus according to a third embodiment of the present invention with reference to FIG. 7. The same structural components as those in FIG. 1 are designated by identical reference symbols, and their description will be omitted.

The optical transmission apparatus 40 according to the third embodiment further has a function of adding or dropping a plurality of optical signals having a different wavelength to each other, as compared with the optical transmission apparatus 10 of the first embodiment. More specifically, the optical transmission apparatus 40 has a receiver 41, a transmitter 42, and a level adjuster 43 that are additionally provided to the structure of the optical transmission apparatus 10 shown in FIG. 1. In addition, the function of the control circuit 44 is also changed in accordance with the addition of those elements.

The receiver 12 receives the drop optical signal 31 having a wavelength $\lambda k1$. The receiver 41 receives a drop optical signal 45 having a wavelength $\lambda k2$ ($\neq \lambda k1$). The transmitter 14 transmits the add optical signal 33 having the wavelength $\lambda k1$. The transmitter 42 transmits an add optical signal 46 having the wavelength $\lambda k2$. The level adjuster 15 adjusts the transmission level of the add optical signal 33 having the wavelength $\lambda k1$. The level adjuster 43 adjusts the transmission level of the add optical signal 46 having the wavelength $\lambda k2$. The control circuit 44 controls the level adjusters 15 and 43, individually.

Subsequently, the operation of the optical transmission apparatus 40 will be described.

First, the WDM optical signal ($\lambda 1$ to $\lambda m$) 30 is demultiplexed into the respective wavelengths by means of the demultiplexer 11. Then, the drop optical signal 31 having the wavelength $\lambda k1$ is branched and received by the receiver 12. Likewise, the drop optical signal 45 having the wavelength $\lambda k2$ is branched and received by the receiver 41. The through optical signals 32 having other wavelengths are transmitted to the multiplexer 13. On the other hand, the add optical signal 33 having the wavelength $\lambda k1$ which has been outputted from the transmitter 14 is adjusted in the optical level by the level adjuster 15. Likewise, the add optical signal 46 having the wavelength $\lambda k2$ which has been outputted from the transmitter 42 is adjusted in the optical level by the level adjuster 43. Then, the add optical signal 33 having the wavelength $\lambda k1$ and the add optical signal 46 having the wavelength $\lambda k2$ are multiplexed by the multiplexer 13 together with the through optical signals 32 having other wavelengths.

Subsequently, a description will be given of the operation when the total input level to the EDF 18 varies. When the through optical signals 32 are shut down due to the breaking of a line or the circuit disturbance, the variation of the input level is detected with the PD 17. In this case, the control circuit 44 controls the respective level adjusters 15 and 43 to adjust the transmission levels of the plural add optical signals 33 and 46 (plural residual optical signals) which are transmitted from the transmitters 14 and 42. Then, the control circuit 44 controls the output levels of those add optical signals to be values before the output levels vary. With the above operation, the output levels of the residual optical signals are kept constant even before and after the total input level of the EDF 18 varies. As a result, the transitional response characteristic of when the total input level varies can be improved. The third embodiment is different from the first embodiment in that the plural add optical signals are adjusted. This example shows a structural example in which two wavelengths are added or dropped, but three wavelengths or more can be added or dropped with a similar structure.

In the case of the third embodiment, it is necessary to use the control flow chart shown in FIG. 5A. This is because the respective levels of the plural residual optical signals 33 and 46 cannot be monitored by the PD 17, and only the total level can be monitored. For that reason, the control circuit 44 controls the respective level adjusters 15 and 43 by a predetermined value.

As described above, the third embodiment has the same advantages as those of the first embodiment, and also has the advantage that the plural add optical signals can be used.

Subsequently, a description will be given of an optical transmission apparatus according to a fourth embodiment of the present invention with reference to FIG. 8. The same structural components as those in FIG. 7 are designated by identical reference symbols, and their description will be omitted.

Figure 7:
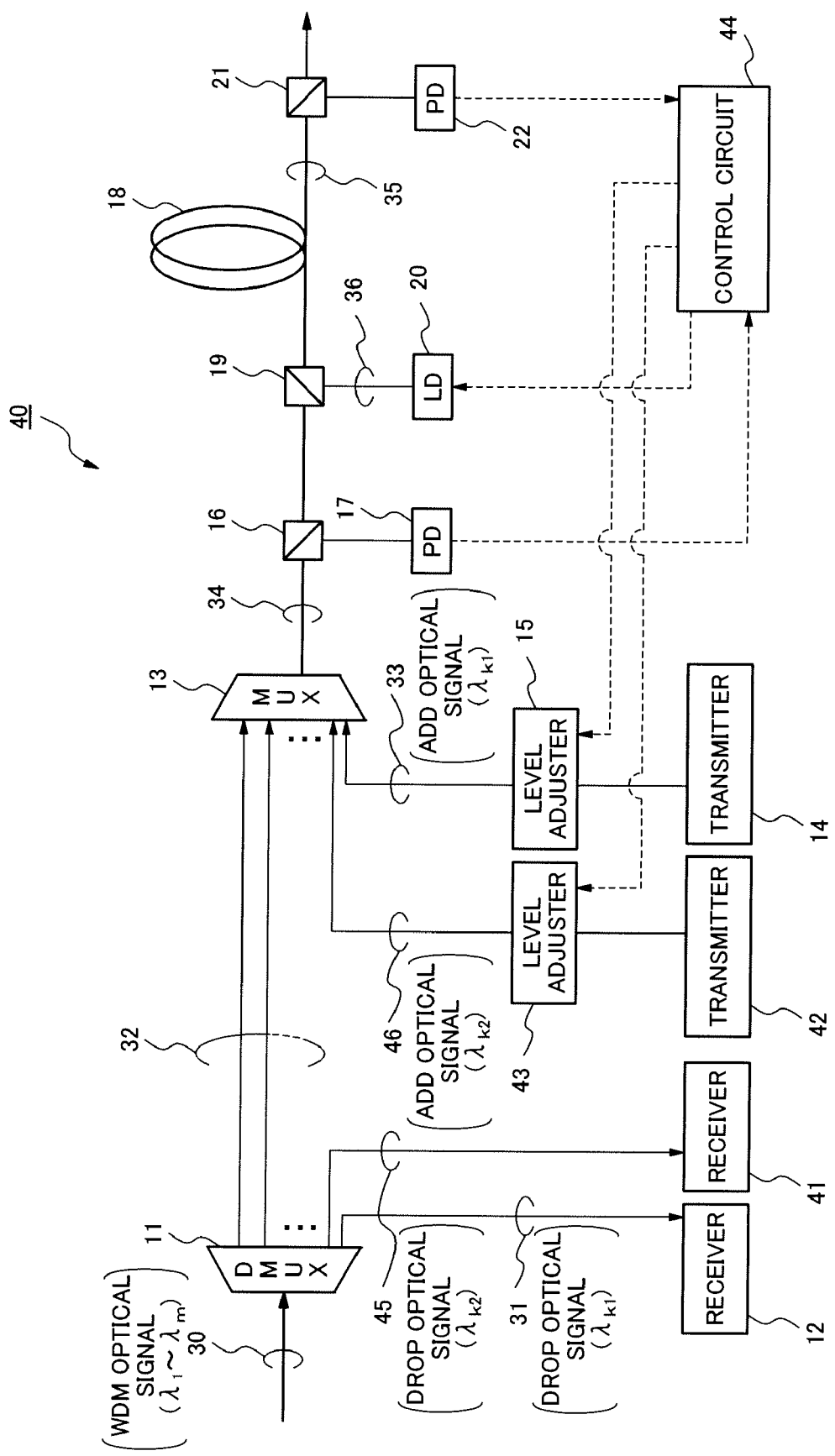
FIG. 7 is a structural diagram showing an optical transmission apparatus according to a third embodiment of the present invention.
Figure 8:
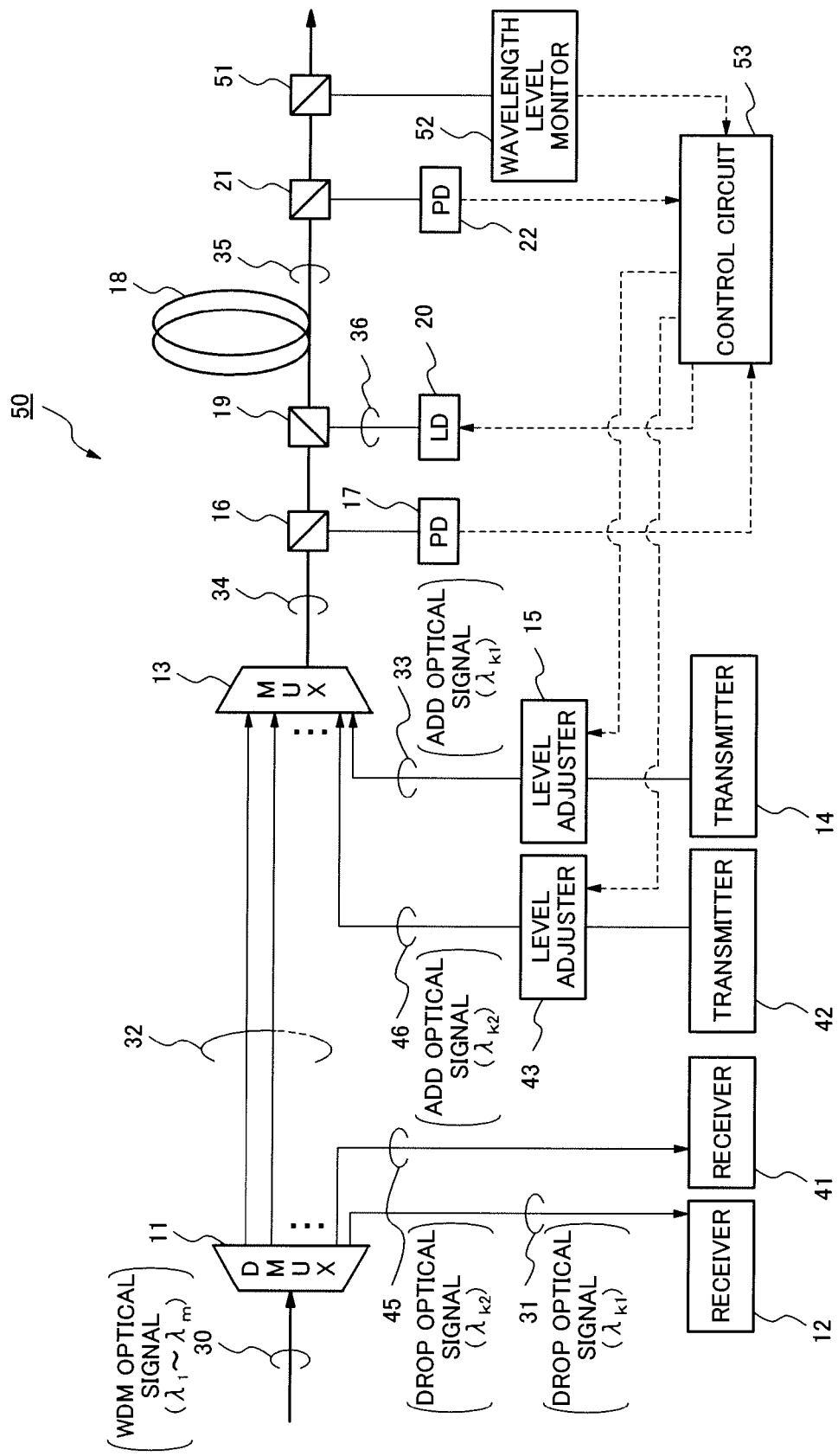
FIG. 8 is a structural diagram showing an optical transmission apparatus according to a fourth embodiment of the present invention.

An optical transmission apparatus 50 according to the fourth embodiment has an optical coupler 51 and a wavelength level monitor 52 as the wavelength level detecting unit added to the structure of the optical transmission apparatus 40 shown in FIG. 7. In addition, the function of the control circuit 53 is changed with the addition of the above elements. The optical coupler 51 divides the WDM optical signal 35 that has been amplified by the EDF 18 into two. The wavelength level monitor 52 detects the level of the optical signal having each wavelength through the optical coupler 51 with respect to the WDM optical signal 35 that has been amplified by the EDF 18.

In the case where the through optical signals 32 are shut down due to the breaking of a line or the circuit disturbance, the add optical signals 33 and 46 are amplified by the EDF 18. Then, the amplified add optical signals 33 and 46 are monitored by the wavelength level monitor 52 through the optical coupler 51. Then, the level of the optical signal having each of the wavelengths $\lambda k1$ and $\lambda k2$ is monitored by the wavelength level monitor 52. In this way, the output levels of the respective wavelengths can be known in the fourth embodiment. Therefore, the control circuit 53 is capable of executing the feedback control shown in FIG. 5B or 5C with respect to the respective level adjusters 15 and 43.

As described above, the fourth embodiment has the same advantages as those in the first embodiment, and also has the advantage that the plural add optical signals can be controlled, individually. In addition, the fourth embodiment is capable of conducting the feedback control on the plural add optical signals.

Figure 9:
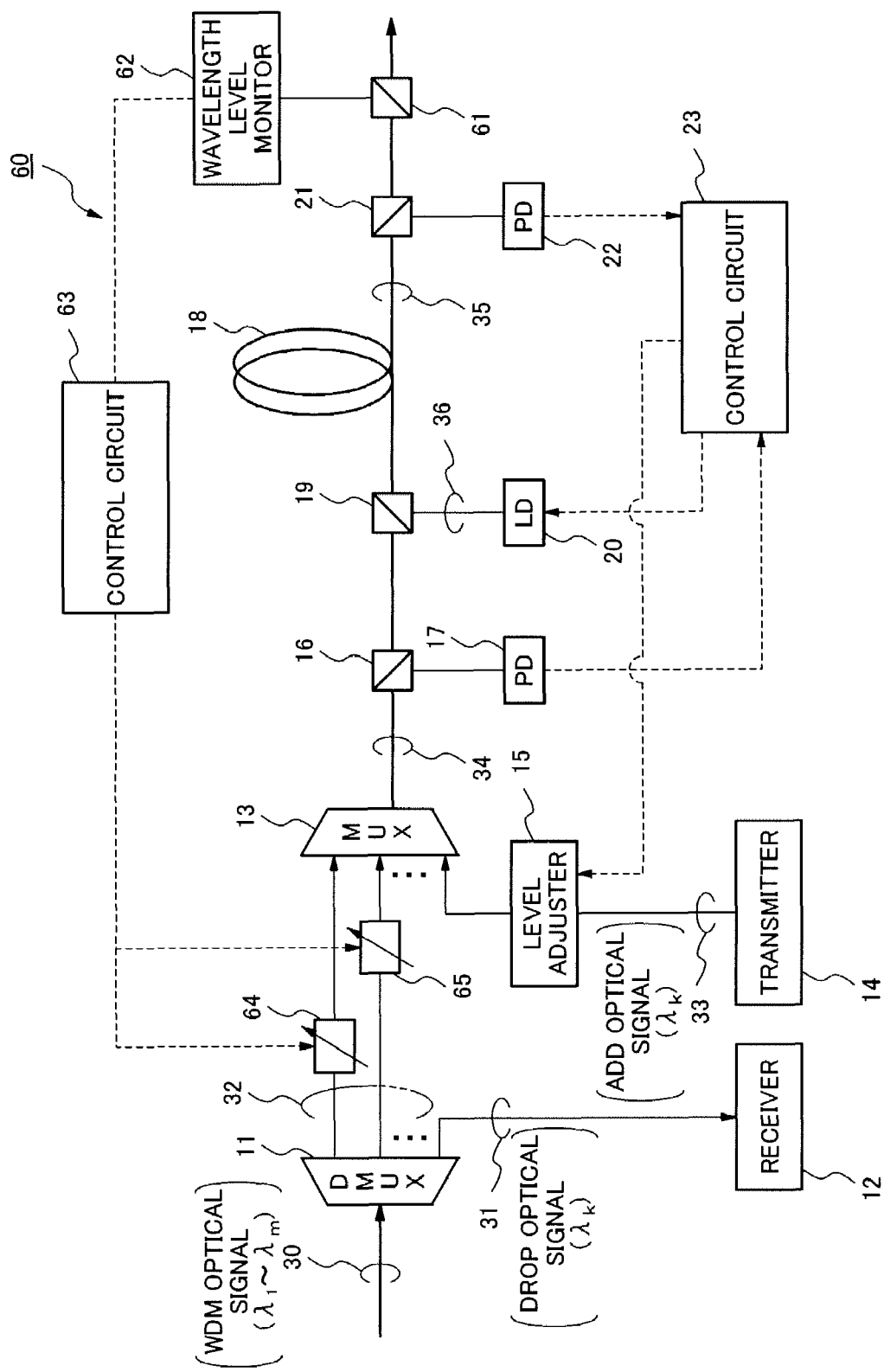
FIG. 9 is a structural diagram showing an optical transmission apparatus according to a fifth embodiment of the present invention.

Subsequently, a description will be given of an optical transmission apparatus according to a fifth embodiment of the present invention with reference to FIGS. 9 and 10. The same structural components as those in FIG. 1 are designated by identical reference symbols, and therefore their description will be omitted.

An optical transmission apparatus 60 according to a fifth embodiment has an optical coupler 61, a wavelength level monitor 62, a control circuit 63, and level adjusters 64, 65 . . ., added to the structure of the optical transmission apparatus 10 shown in FIG. 1. FIGS. 9 and 10 show only the level adjusters 64 and 65, which are located on the respective optical fibers that connect between the demultiplexer 11 and the multiplexer 13. The wavelength level monitor 62 detects the level of the optical signal having each wavelength through an optical coupler 61 with respect to the WDM optical signal 35 that has been amplified by the EDF 18, as with the wavelength level monitor 52 of the fourth embodiment. The level adjusters 64 and 65 adjust the levels of the through optical signals 32 that are outputted to the multiplexer 13 from the demultiplexer 11, individually. The control circuit 63 has a function of detecting the variation of the optical signal of each wavelength on the basis of the level of the optical signal having each wavelength which has been detected by the wavelength level monitor 62. In addition, the control circuit 63 has a function of controlling the level adjusters 64, 65, . . . when detecting the variation of the optical signal having either of wavelengths. To be specific, the function is used to control the level adjusters 64, 65, . . . so that the output levels that has been amplified by the EDF 18 becomes constant with respect to the optical signals of the wavelengths whose variation has not been detected. With the above structure, the fifth embodiment is capable of keeping constant the output levels of the residual optical signals before and after the total input level variation to the EDF 18 even in the case where the through optical signals 32 other than the add optical signal 33 become the residual optical signals at the time of the total input level variation to the EDF 18.

Subsequently, the operation of the optical transmission apparatus 60 will be described with reference to FIG. 10. First, the demultiplexer 11 demultiplexes the inputted WDM optical signal 30 into the optical signals having the respective wavelengths. Then, the drop optical signal having the wavelength λk branches off to the receiver 12. The through optical signals 32 having other wavelengths are transmitted to the multiplexer 13 through the level adjusters 64, 65, . . . which are located, respectively. On the other hand, the add optical signal 33 having the wavelength λk which has been transmitted from the transmitter 14 is outputted to the multiplexer 13 through the level adjuster 15. The multiplexer 13 multiplexes the through optical signals 32 and the add optical signal 33. Then, the multiplexed WDM optical signal 34 is amplified by the EDF 18, and outputted as the WDM optical signal 35. The WDM optical signal 35 that has been amplified by the EDF 18 branches off with the optical coupler 61 that is located on the output side, and then is outputted to the wavelength level monitor 62. The level of the optical signal having each wavelength is monitored by the wavelength level monitor 62.

Figure 10:
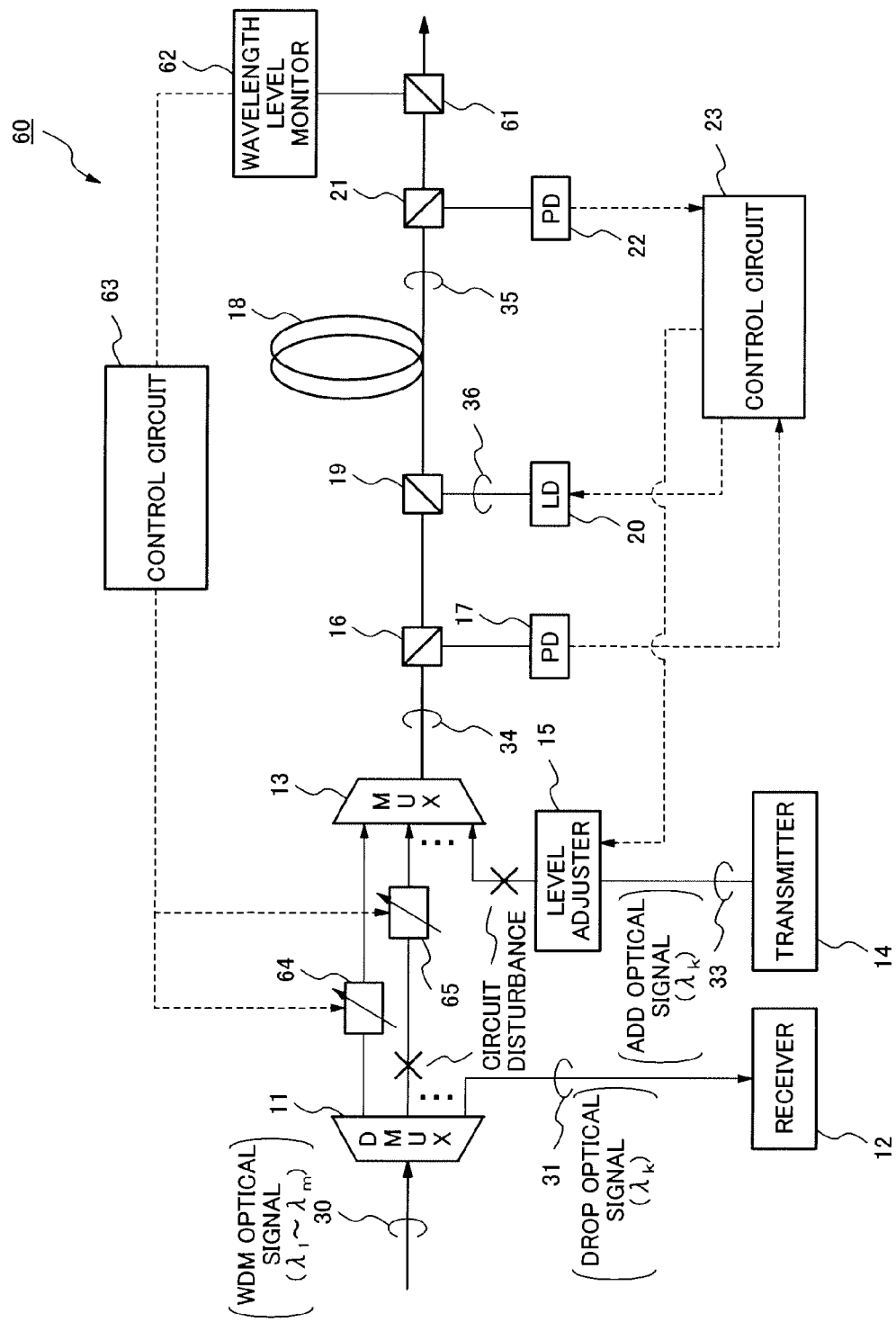
FIG. 10 is an explanatory diagram showing an operation of the optical transmission apparatus shown in FIG. 9.

Now, it is assumed that the circuit disturbance has occurred as shown in FIG. 10. In this case, the total input level variation to the EDF 18 occurs. Then, the wavelength level monitor 62 monitors the respective wavelengths and their levels. The control circuit 63 is capable of adjusting the level adjusters 64 and 65 on the basis of the monitored results so that the output level of the residual optical signal is kept constant. As an example, in the case where a disturbance has occurred in the line of the level adjuster 65, the control circuit 63 adjusts the level adjuster 64 and level adjusters of other lines, to thereby make the output level of the residual optical signal constant. In addition, in the fifth embodiment, as shown in FIG. 10, even in the case where the line of the add optical signal 33 is shut down, the level adjusters 64 and 65 are adjusted, thereby making it possible to make the output level of the residual optical signal constant.

Further, even in the case where no large variation has occurred in the total input level to the EDF 18, the wavelength level monitor 62 always monitors the level in each wavelength of the WDM optical signal 35. On the basis of the monitored results, the control circuit 63 is capable of controlling the level adjusters 64, 65, . . . so that the level in each wavelength of the WDM optical signal 35 is kept constant. As a result, the same output levels are always obtained with respect to the respective wavelengths.

As described above, the fifth embodiment has the same advantages as those in the first embodiment, and also has the advantage that it is possible to adjust to an appropriate output level with respect to each wavelength of the WDM optical signal. In addition, the fifth embodiment has the advantage that the output level of the residual optical signal can be appropriately controlled with respect to the obstacle of the add optical signal. Further, even in the case where no large variation has occurred in the optical power of the WDM optical signal, the fifth embodiment has the advantage that the same output levels are always obtained with respect to the respective wavelengths.

Figure 11:
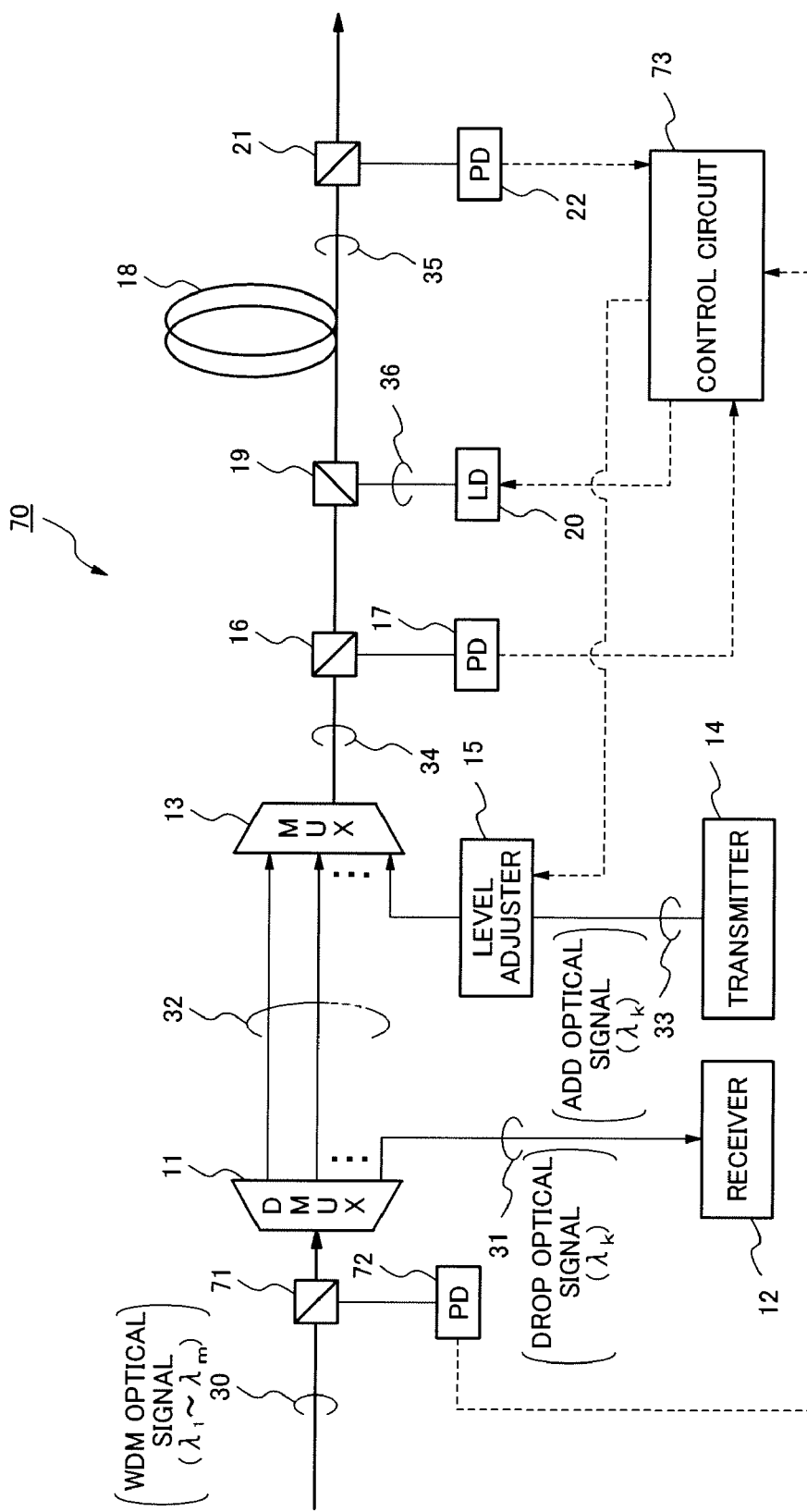
FIG. 11 is a structural diagram showing an optical transmission apparatus according to a sixth embodiment of the present invention.

Subsequently, a description will be given of an optical transmission apparatus according to a sixth embodiment of the present invention with reference to FIGS. 11 and 12. The same structural components as those in FIG. 1 are designated by identical reference symbols, and therefore their description will be omitted.

An optical transmission apparatus 70 according to the sixth embodiment has an optical coupler 71 and a PD 72 as means for detecting the input level to the demultiplexer 11 added to the structure of the optical transmission apparatus 10 shown in FIG. 1. The PD 72 detects the optical level of the WDM optical signal 30 at the input side of the demultiplexer 11 through the optical coupler 71. Then, the PD 72 notifies the control circuit 73 of the optical level of the detected WDM optical signal 30. The control circuit 73 controls the variation of the input level to the EDF 18 on the basis of the optical level of the notified WDM optical signal 30.

Hereinafter, a description will be given in more detail.

First, the WDM optical signal 30 is outputted to the demultiplexer 11 and the PD 72 by means of the optical coupler 71. The PD 72 monitors the power of the WDM optical signal 30, and notifies the control circuit 73 of the result. After that, the WDM optical signal 30 that has been outputted to the demultiplexer 11 is transmitted as in the first embodiment. The sixth embodiment is different from the first embodiment in that the control circuit 73 is used for control.

Figure 12:
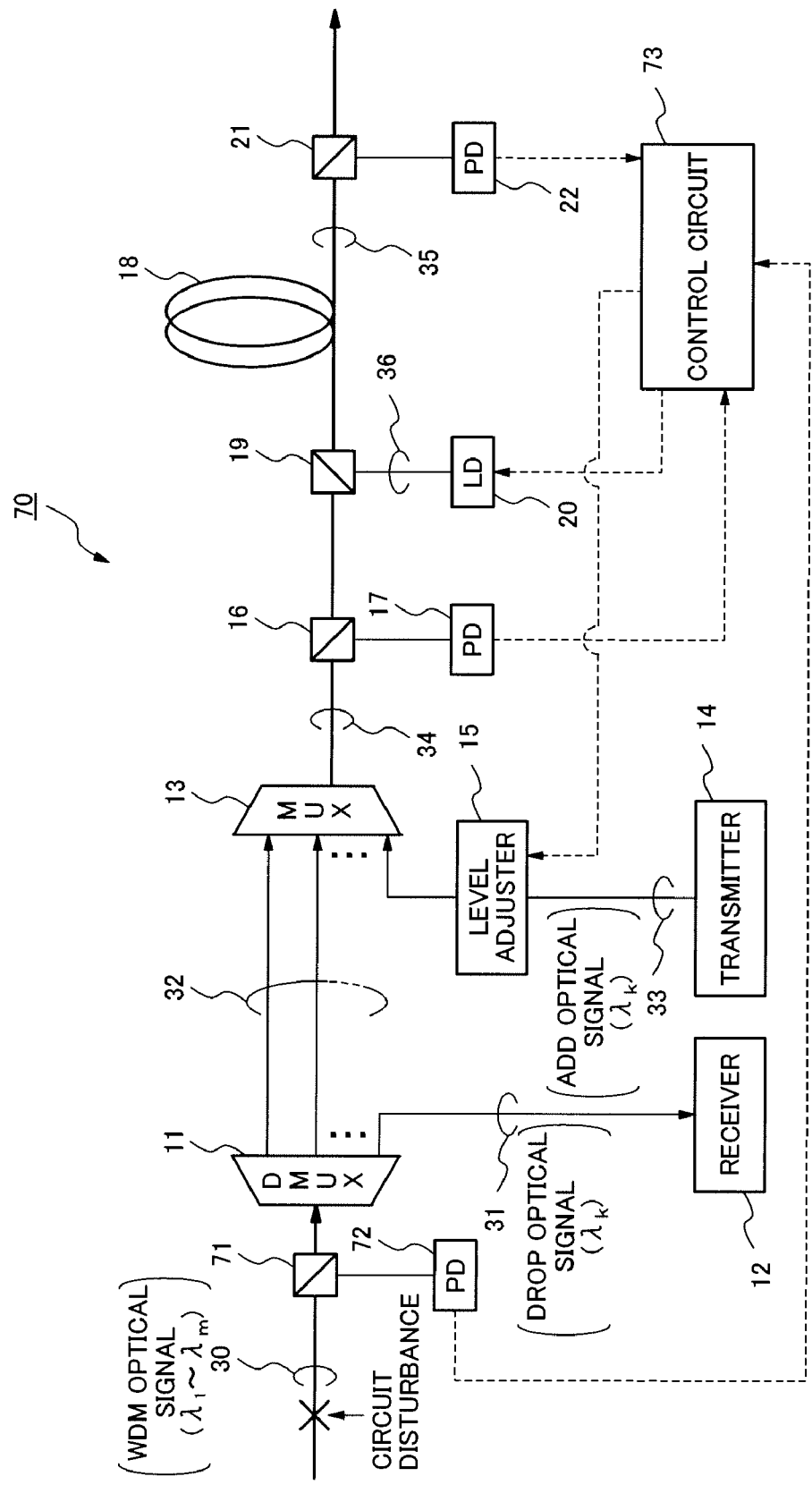
FIG. 12 is an explanatory diagram showing an operation of the optical transmission apparatus shown in FIG. 11.

As shown in FIG. 12, it is assumed that the WDM optical signal 30 is shut down due to the breaking of a line or the like before the optical coupler 71. In this situation, the input power to the optical transmission apparatus 70 varies due to the breaking of a line. Under the circumstance, in the sixth embodiment, control is conducted as follows so that the output level of the residual optical signal (add optical signal 33) are not changed before and after the input power to the optical transmission apparatus 70 varies.

First, the PD 72 that is disposed upstream of the demultiplexer 11 detects the level of the WDM optical signal 30 through the optical coupler 71 in advance. Then, the PD 72 notifies the control circuit 73 of the detected results. Upon receiving the notification from the PD 72, the control circuit 73 determines whether there is a variation of the input level, or not. In the case where it is determined that there is the variation, the control circuit 73 adjusts the level adjuster 15 so that the output level of the residual optical signal (add optical signal 33) before and after the total input level variation to the EDF 18 is kept constant. As a result, the input level of the residual optical signal (add optical signal 33) is adjusted.

As described above, in the sixth embodiment, the variation of the WDM optical signal that is inputted to the EDF 18 is detected by the PD 72 that is disposed in an input part of the optical transmission apparatus 70, thereby making it possible to detect the variation at an early stage. As a result, the sixth embodiment has the same effects as those in the first embodiment, and also has an effect that the variation of the WDM optical signal that is inputted to the optical transmission apparatus can be coped with more rapidly.

Figure 13:
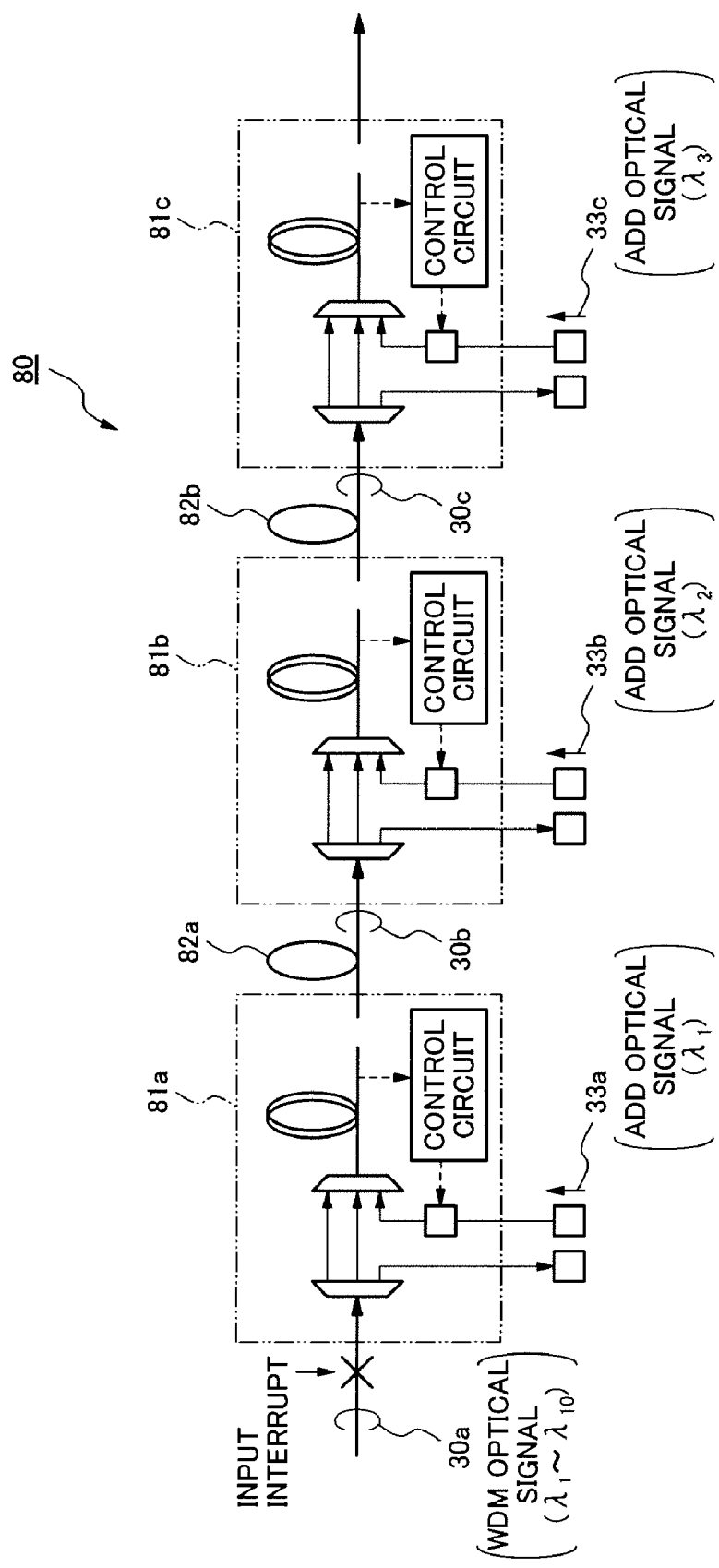
FIG. 13 is a structural diagram showing an optical transmission system according to a first embodiment of the present invention.
Figure 14:
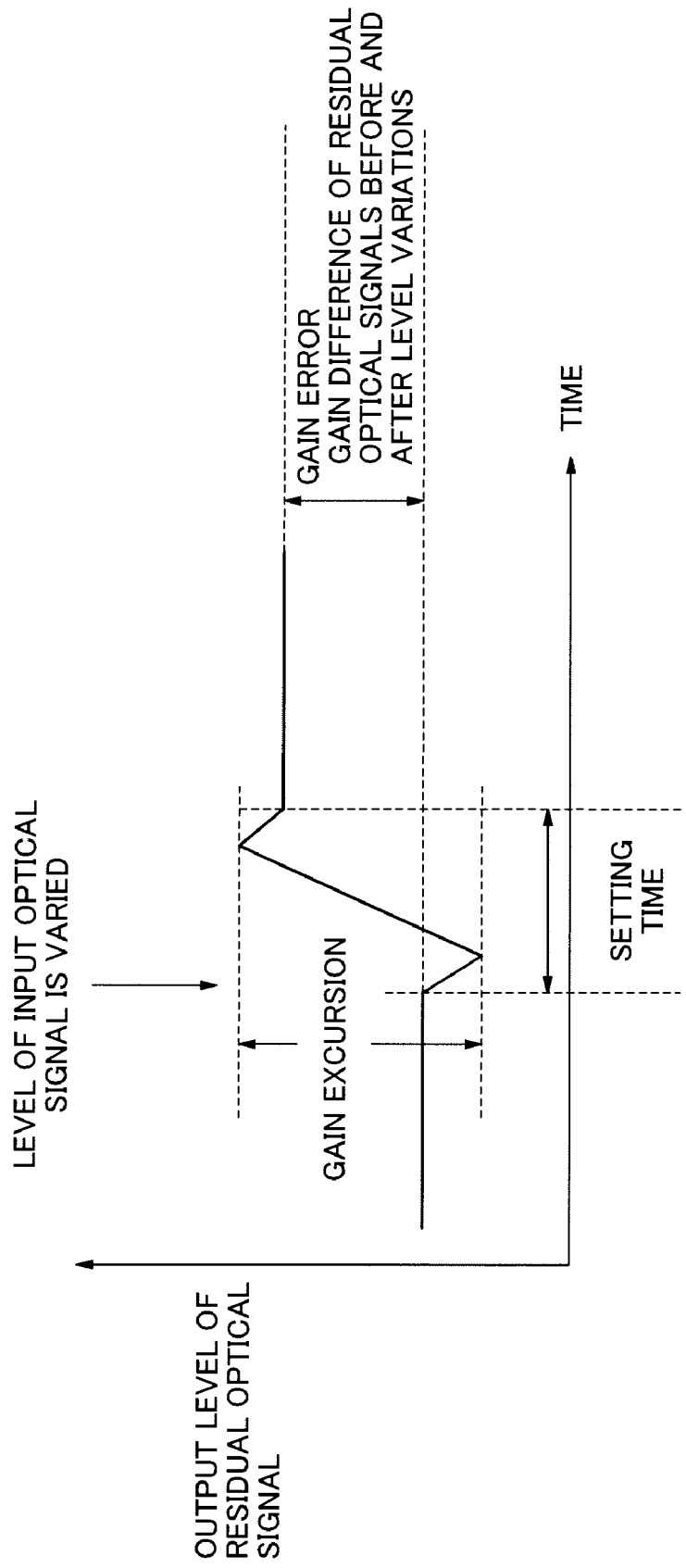
FIG. 14 is an explanatory diagram showing indexes indicative of a transitional response characteristic of an optical amplifier.

FIG. 13 is a structural diagram showing an optical transmission system according to a first embodiment of the present invention. Hereinafter, a description will be given with reference to the accompanying drawings.

An optical transmission system 80 according to this embodiment includes plural optical transmission apparatuses 81*a*, 81*b*, 81*c*, . . . and optical transmission lines 82*a*, 82*b*, . .

. that connect those optical transmission apparatuses. The optical transmission apparatuses 81a, 81b, 81c, . . . are any one of optical transmission apparatuses (OADM nodes) according to the above-mentioned first to sixth embodiments. After that, since the transitional response of the optical amplifier is suppressed in the respective optical transmission apparatuses 81a, 81b, 81c, . . . , the transitional response of the entire optical transmission system 80 is also suppressed.

In addition, a description will be given in more detail as examples of the optical transmission apparatuses 81a, 81b, and 81c. The wavelengths of the add optical signals 33a, 33b, and 33c in the optical transmission apparatuses 81a, 81b, and 81c are λ1, λ2, and λ3, respectively. As described above, the respective optical transmission apparatuses 81a, 81b, and 81c control the level adjuster so that the output levels of the respective add optical signals 33a, 33b, and 33c to the optical amplifiers are kept constant before and after the WDM optical signal 30a is shut down.

In this example, it is assumed that the WDM optical signal 30a is shut down as shown in the figure. Then, the optical transmission apparatus 81a controls the output level of the add optical signal 33a to the optical amplifier to be constant. Then, in the optical transmission apparatus 81b at the subsequent stage, the WDM optical signal 30b is only the optical signal with λ1. In this case, the optical transmission apparatus 81b controls the output level of the add optical signal 33b to the optical amplifier to be constant. Then, in the optical transmission apparatus 81c at the subsequent stage, the WDM optical signal 30c is only the optical signals with λ1 and λ2. In this case, the optical transmission device 81c controls the output level of the add optical signal 33c to the optical amplifier to be constant.

The above sequential control can be realized by providing the level of the add optical signal due to the level adjuster according to the number of remaining optical signals in advance. In this situation, the number of residual optical signals can be detected by the PD because the number is substantially in proportion to the amount of light received by the PD.

As described above, in this embodiment, the optical transmission apparatuses according to the present invention are connected at multi-stages, and thereby the transitional response of the optical amplifier can be suppressed even in the multi-stage system. As usual, the optical amplifiers are connected at the multi-stages in use. For that reason, an effect that not only the transitional response of a certain optical amplifier is suppressed, but also the transitional response of the entire optical transmission system can be suppressed is extremely great from the viewpoint of the actual system.

The above description was given of the embodiments of the present invention. However, the configuration or layout of the respective structural parts is not limited to only the configurations in the figures, and the present invention can be appropriately changed within the scope that does not deviate from the features of the present invention. For example, the EDF may be replaced with another optical fiber amplifier (for example, TDF).

Also, the plural embodiments can be combined together in use. For example, it is possible to provide plural transmitters and plural level adjusters in the structure of the fifth embodiment as in the fourth embodiment. Also, it is possible to dispose the optical coupler and the PD in front of the demultiplexer 11 in the structure of the fifth embodiment as in the sixth embodiment. In this way, arbitrary embodiments can be combined together.

While the present invention has been described in connection with certain exemplary embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

Further, the inventor's intent is to retain all equivalents of the claimed invention even if the claims are amended later during prosecution.

What is claimed is:

1. An optical transmission apparatus for transmitting a wavelength division multiplexed optical signal, comprising:

a transmitting unit for transmitting an optical signal with a specified wavelength;

a multiplexing unit for multiplexing the optical signal with the specified wavelength and an optical signal with a wavelength other than the specified wavelength and outputting the multiplexed signal as a wavelength division multiplexed optical signal;

an optical amplifier for amplifying the wavelength division multiplexed optical signal outputted from the multiplexing unit;

a level detecting unit detecting a variation of an optical power of the wavelength division multiplexed optical signal inputted to the optical amplifier; and a level adjusting unit for adjusting, when a variation of the optical power of the wavelength division multiplexed optical signal is detected by the level detecting unit, a transmitting power of the optical signal with the specified wavelength transmitted from the transmitting unit so that an output power becomes a level before the variation, wherein the level adjusting unit includes a level adjuster for adjusting the transmitting power of the optical signal with the specified wavelength which is transmitted from the transmitting unit, and a control circuit for controlling the level adjuster according to the variation of the output power which is detected by the level detecting unit;

a through level adjusting unit for adjusting the powers of the optical signals with the respective wavelengths which are caused to pass through the demultiplexing unit and the multiplexing unit;

an optical amplifier for amplifying the wavelength division multiplexed signal that is multiplexed by the multiplexing unit; and a wavelength level detecting unit for detecting the powers of the optical signals with the respective wavelengths of the wavelength division multiplexed optical signal which is amplified by the optical amplifier, wherein the through level adjusting unit adjusts the powers of the through optical signals with the respective wavelengths which are caused to pass through the demultiplexing unit and the multiplexing unit to be kept constant on the basis of the powers of the optical signals with the respective wavelengths which are detected by the wavelength level detecting unit.

2. An optical transmission apparatus according to claim 1, wherein the through level adjusting unit includes a level adjuster that is located in each of through ports between the demultiplexing unit and the multiplexing unit, and a control circuit for controlling the respective level adjusters on the basis of the powers of the optical signals of the respective wavelengths which are detected by the wavelength level detecting unit.

3. An optical transmission apparatus for transmitting a wavelength division multiplexed optical signal, comprising:

a transmitting unit for transmitting an optical signal with a specified wavelength;

a multiplexing unit for multiplexing the optical signal with the specified wavelength and an optical signal with a wavelength other than the specified wavelength and outputting the multiplexed signal as a wavelength division multiplexed optical signal;

an optical amplifier for amplifying the wavelength division multiplexed optical signal outputted from the multiplexing unit;

a level detecting unit detecting a variation of an optical power of the wavelength division multiplexed optical signal inputted to the optical amplifier; and a level adjusting unit for adjusting, when a variation of the optical power of the wavelength division multiplexed optical signal is detected by the level detecting unit, a transmitting power of the optical signal with the specified wavelength transmitted from the transmitting unit so that an output power becomes a level before the variation, wherein the level adjusting unit includes a level adjuster for adjusting the transmitting power of the optical signal with the specified wavelength which is transmitted from the transmitting unit, and a control circuit for controlling the level adjuster according to the variation of the output power which is detected by the level detecting unit; and an input power detecting unit for detecting the input power of the wavelength division multiplexed optical signal that is inputted to the demultiplexing unit, wherein the detection information by the input power detecting unit is transmitted to the level adjusting unit and reflected to the control of the transmitting power of the optical signal with the specified wavelength which is transmitted from the transmitting unit.

* * * * *